United States Patent
Jia et al.

(10) Patent No.: US 11,949,497 B2
(45) Date of Patent: Apr. 2, 2024

(54) SYSTEM AND METHODS FOR COHERENT PON ARCHITECTURE AND BURST-MODE RECEPTION

(71) Applicant: CABLE TELEVISION LABORATORIES, INC., Louisville, CO (US)

(72) Inventors: Zhensheng Jia, Superior, CO (US); Luis Alberto Campos, Superior, CO (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/838,853

(22) Filed: Jun. 13, 2022

(65) Prior Publication Data

US 2022/0321245 A1 Oct. 6, 2022

Related U.S. Application Data

(60) Continuation of application No. 17/208,697, filed on Mar. 22, 2021, now Pat. No. 11,362,756, which is a
(Continued)

(51) Int. Cl.
*H04B 10/00* (2013.01)
*H04J 14/02* (2006.01)
*H04J 14/08* (2006.01)

(52) U.S. Cl.
CPC ........ *H04J 14/023* (2013.01); *H04J 14/0204* (2013.01); *H04J 14/0282* (2013.01); *H04J 14/08* (2013.01)

(58) Field of Classification Search
CPC .. H04J 14/023; H04J 14/0204; H04J 14/0282; H04J 14/08; H04B 10/616
See application file for complete search history.

(56) References Cited

U.S. PATENT DOCUMENTS 5,067,139 A * 11/1991 Baker ................. H04L 27/2273
329/304
5,710,792 A * 1/1998 Fukawa ............. H04L 25/03273
375/232
(Continued)

FOREIGN PATENT DOCUMENTS

WO 2015131501 A1 9/2015

OTHER PUBLICATIONS

IPRP mailed Oct. 3, 2019 in PCT/US2018/024117.
(Continued)

*Primary Examiner* — Agustin Bello
(74) *Attorney, Agent, or Firm* — Josh C. Snider; Snider IP

(57) ABSTRACT

An optical network communication system utilizes a passive optical network including an optical hub having an optical line terminal, downstream transmitter, an upstream receiver, a processor, and a multiplexer. The upstream receiver includes a plurality of TWDMA upstream subreceivers. The system includes a power splitter for dividing a coherent optical signal from the optical hub into a plurality of downstream wavelength signals, a long fiber to carry the coherent optical signal between the optical hub and the power splitter, and a plurality of serving groups. Each serving group includes a plurality of optical network units configured to (i) receive at least one downstream wavelength signal, and (ii) transmit at least one upstream wavelength signal. The system includes a plurality of short fibers to carry the downstream and upstream wavelength signals between the power splitter and the optical network units, respectively. Each upstream subreceiver receives a respective upstream wavelength signal.

19 Claims, 10 Drawing Sheets

Related U.S. Application Data division of application No. 16/657,781, filed on Oct. 18, 2019, now Pat. No. 10,958,371, which is a division of application No. 15/934,321, filed on Mar. 23, 2018, now Pat. No. 10,484,124.

(60) Provisional application No. 62/476,403, filed on Mar. 24, 2017.

(56) References Cited

U.S. PATENT DOCUMENTS

| | | | | |
|---|---|---|---|---|
| 6,385,447 B1* | | 5/2002 | Soleimani | H04B 7/18539 704/215 |
| 7,076,168 B1* | | 7/2006 | Shattil | H04B 10/25752 398/202 |
| 7,260,055 B2 | | 8/2007 | Wang | H04L 25/0228 370/252 |
| 7,522,841 B2* | | 4/2009 | Bontu | H04J 14/06 398/154 |
| 7,983,308 B1* | | 7/2011 | Johnston | H04J 3/0608 398/154 |
| 7,991,296 B1* | | 8/2011 | Johnston | H04J 3/0608 398/154 |
| 8,121,017 B2* | | 2/2012 | Stadelmeier | H04N 21/426 370/203 |
| 8,189,721 B2* | | 5/2012 | Fu | H04L 25/022 375/345 |
| 8,203,929 B2* | | 6/2012 | Atungsiri | H04L 27/2613 370/203 |
| 8,248,975 B2* | | 8/2012 | Fujita | H04L 27/2695 370/208 |
| 8,260,156 B2* | | 9/2012 | Qian | H04B 10/6162 398/205 |
| 8,315,528 B2* | | 11/2012 | Roberts | H04B 10/6161 398/208 |
| 8,340,534 B2* | | 12/2012 | Zhang | H04J 14/06 398/208 |
| 8,391,726 B2* | | 3/2013 | Chen | H04B 10/60 375/267 |
| 8,848,747 B2* | | 9/2014 | Zeng | H04B 10/616 398/209 |
| 10,038,498 B1* | | 7/2018 | Fan | H04B 10/532 |
| 10,484,124 B2* | | 11/2019 | Jia | H04B 10/616 |
| 2004/0001563 A1* | | 1/2004 | Scarpa | H04L 27/2679 375/326 |
| 2004/0004934 A1* | | 1/2004 | Zhu | H04L 27/2675 370/208 |
| 2004/0005022 A1* | | 1/2004 | Zhu | H04L 27/2662 375/365 |
| 2004/0240376 A1* | | 12/2004 | Wang | H04L 25/022 370/204 |
| 2004/0240597 A1* | | 12/2004 | Cattaneo | H04B 1/7183 375/354 |
| 2005/0019036 A1* | | 1/2005 | Soto | H04L 25/03878 398/135 |
| 2005/0196176 A1* | | 9/2005 | Sun | H04B 10/2572 398/152 |
| 2007/0092259 A1* | | 4/2007 | Bontu | H04B 10/6161 398/147 |
| 2007/0092260 A1* | | 4/2007 | Bontu | H04J 3/0608 398/152 |
| 2008/0279564 A1* | | 11/2008 | Han | H04B 10/5161 398/152 |
| 2009/0285137 A1* | | 11/2009 | Fujita | H04L 27/261 375/295 |
| 2010/0246639 A1* | | 9/2010 | Roh | H04B 1/7176 375/138 |
| 2011/0033184 A1* | | 2/2011 | Zhang | H04J 14/06 398/65 |
| 2011/0206385 A1* | | 8/2011 | Chen | H04B 10/60 398/208 |
| 2012/0027419 A1* | | 2/2012 | Kaneda | H04L 27/2675 398/208 |
| 2012/0141116 A1* | | 6/2012 | Zeng | H04J 3/14 398/1 |
| 2012/0275784 A1* | | 11/2012 | Soto | H04B 10/40 398/67 |
| 2013/0322882 A1* | | 12/2013 | Fang | H04B 10/27 398/115 |
| 2014/0314414 A1 | | 10/2014 | Cheng et al. | |
| 2014/0341574 A1 | | 11/2014 | Yan | |
| 2014/0341579 A1 | | 11/2014 | Effenberger et al. | |
| 2015/0030324 A1 | | 1/2015 | Chang et al. | |
| 2015/0055956 A1 | | 2/2015 | Lee et al. | |
| 2015/0256262 A1* | | 9/2015 | Kliger | H04L 12/2898 398/58 |
| 2015/0271037 A1* | | 9/2015 | Wiley | H04B 3/46 370/252 |
| 2015/0365172 A1 | | 12/2015 | Luo et al. | |
| 2015/0365190 A1 | | 12/2015 | Wen et al. | |
| 2016/0065304 A1* | | 3/2016 | Hauske | H04B 10/516 398/16 |
| 2016/0080102 A1* | | 3/2016 | Fang | H04B 10/516 398/74 |
| 2016/0088373 A1* | | 3/2016 | Li | H04L 27/38 398/45 |
| 2016/0219506 A1* | | 7/2016 | Pratt | H04L 5/143 |
| 2016/0232874 A1* | | 8/2016 | Matsuda | G09G 5/006 |
| 2016/0247473 A1* | | 8/2016 | Matsuda | G09G 3/20 |
| 2016/0254862 A1 | | 9/2016 | Hayashi | |
| 2016/0262138 A1* | | 9/2016 | Sundberg | H04L 5/14 |
| 2017/0111116 A1* | | 4/2017 | Ohara | H04B 10/5161 |
| 2017/0149502 A1* | | 5/2017 | Krishnan | H04B 10/6164 |
| 2017/0195150 A1* | | 7/2017 | Chu | H04L 27/156 |
| 2017/0279531 A1* | | 9/2017 | Drummond | H04B 10/25073 |
| 2017/0338893 A1* | | 11/2017 | Cavaliere | H04B 10/6165 |
| 2018/0026739 A1 | | 1/2018 | Gao et al. | |
| 2018/0034579 A1* | | 2/2018 | Liu | H04Q 11/0067 |
| 2018/0138982 A1* | | 5/2018 | Irie | H04B 10/2557 |
| 2018/0278360 A1* | | 9/2018 | Jia | H04J 14/08 |
| 2019/0305854 A1* | | 10/2019 | Campos | H04B 10/6164 |
| 2020/0052808 A1* | | 2/2020 | Jia | H04B 10/616 |
| 2021/0006346 A1* | | 1/2021 | Liu | H04Q 11/0067 |
| 2021/0184776 A1* | | 6/2021 | Vazzana | H04B 10/616 |
| 2021/0226718 A1* | | 7/2021 | Jia | H04J 14/0282 |
| 2022/0321245 A1* | | 10/2022 | Jia | H04J 14/023 |

OTHER PUBLICATIONS

Komo Ryo et al: "Demonstration of Real-Time Burst-Mode Digital Coherent Reception With Wide Dynamic Range in DSP-Based PON UPstream".

Naoto Yoshimoto et al: "DSP-based optical access approaches for enhancing NG-PON2 systems".

* cited by examiner

SYSTEM AND METHODS FOR COHERENT PON ARCHITECTURE AND BURST-MODE RECEPTION

CROSS REFERENCE TO RELATED APPLICATIONS

This application is a continuation of U.S. patent application Ser. No. 17/208,697, filed Mar. 22, 2021. U.S. patent application Ser. No. 17/208,697 is a divisional of U.S. patent application Ser. No. 16/657,781, filed Oct. 18, 2019. U.S. patent application Ser. No. 16/657,781 is a divisional of U.S. patent application Ser. No. 15/934,321, filed Mar. 23, 2018, now U.S. Pat. No. 10,484,124, issued Nov. 19, 2011. U.S. patent application Ser. No. 15/934,321 claims the benefit of and priority to U.S. Provisional Patent Application Ser. No. 62/476,403, filed Mar. 24, 2017. All of these prior applications are incorporated herein by reference in their entireties.

BACKGROUND

The field of the disclosure relates generally to fiber communication networks, and more particularly, to access networks capable of transmitting coherent optical signals.

Fiber-to-the-premise (FTTP) based access networks have been widely deployed in many regions of the world. Increasing demand for high-speed data and video services is presently driving growth in access bandwidth requirements, up to gigabits per second (Gb/s) for residential offerings and multi-Gb/s for business. Conventional FTTP network architectures utilize a passive optical network (PON), for example, a Gigabit passive optical network (GPON) within ITU-T, or an Ethernet passive optical network (EPON) within IEEE. PON can be point-to-multipoint, and is often an economical alternative to point-to-point Ethernet for moderate to large populations. Recent GPON and EPON networks realize 2.5/1.25 Gb/s data rates for downstream and 1.25 Gb/s upstream, respectively, and more recently includes 10-Gb/s PON (XG-PON or IEEE 10G-EPON) for high-bandwidth applications. GPON and EPON have some technical differences in terms of signal encapsulation and dynamic bandwidth allocation, but both PON types are capable of carrying data over fiber through a passive optical network all the way from an optical hub to a customer premise. Both PON types use baseband digital signaling over the fiber to carry information.

Cable operators now regularly offer Gb/s service to residential offerings, and access bandwidth requirements therefrom are expected to grow to multi-Gb/s speeds in response to increasing 4K/8K video streaming, proliferation of cloud computing, "big data," social media, Internet of Things (IoT), and mobile data delivery. Conventional wired networks that are based on PON access technologies have become a dominant architecture to meet such high-capacity demand for end users. Increasingly, PONs are expected to evolve to provide higher per-subscriber data rates and wider coverage of services and applications, while at the same time minimizing capital expenditure (CAPEX) and operating expenditure (OPEX) costs, and also increasing reconfigurable capability for scalable solutions.

However, conventional PON architectures that use direct detection schemes are unable to address these technological support requirement challenges because of the low receiver sensitivity and limited upgrading options in such architectures. Conventional PON architectures are limited in their distance reach, and also in the split ratio they are able to maintain. Conventional PON architectures are also not configured to sufficiently employ upcoming technologies such as next-generation PON (NG-PON, NG-PON2) based on time and wavelength division multiplexing (TWDM), which deploys at 40-Gb/s or more, or 100G-EPON, which are multi-wavelength PON systems.

BRIEF SUMMARY

In an embodiment, an optical network communication system utilizing a passive optical network (PON) includes an optical hub. The optical hub includes an optical line terminal having a downstream transmitter, an upstream receiver, a processor, and a multiplexer. The upstream receiver includes a plurality of upstream subreceivers configured for time and wavelength division multiple access (TWDMA). The system further includes a power splitter configured to divide a coherent optical signal from the optical hub into a plurality of downstream wavelength signals, a long fiber configured to carry the coherent optical signal between the optical hub and the power splitter, and a plurality of serving groups. Each of the plurality of serving groups includes a plurality of optical network units configured to (i) receive at least one of the plurality of downstream wavelength signals, and (ii) transmit at least one upstream wavelength signal. The system further includes a plurality of short fibers configured to carry the downstream and upstream wavelength signals between the power splitter and the plurality of optical network units, respectively. Each of the plurality of upstream subreceivers is configured to receive a respective upstream wavelength signal.

A burst signal format data structure is provided for a coherent burst mode receiver. The burst signal format includes a data stream configured to include a data header and a data payload. The data header includes at least one single-polarization signal and at least one training sequence. The burst signal format further includes a demodulation process configured to detect static information from the data header and provide dynamic channel information to the data payload.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1A:
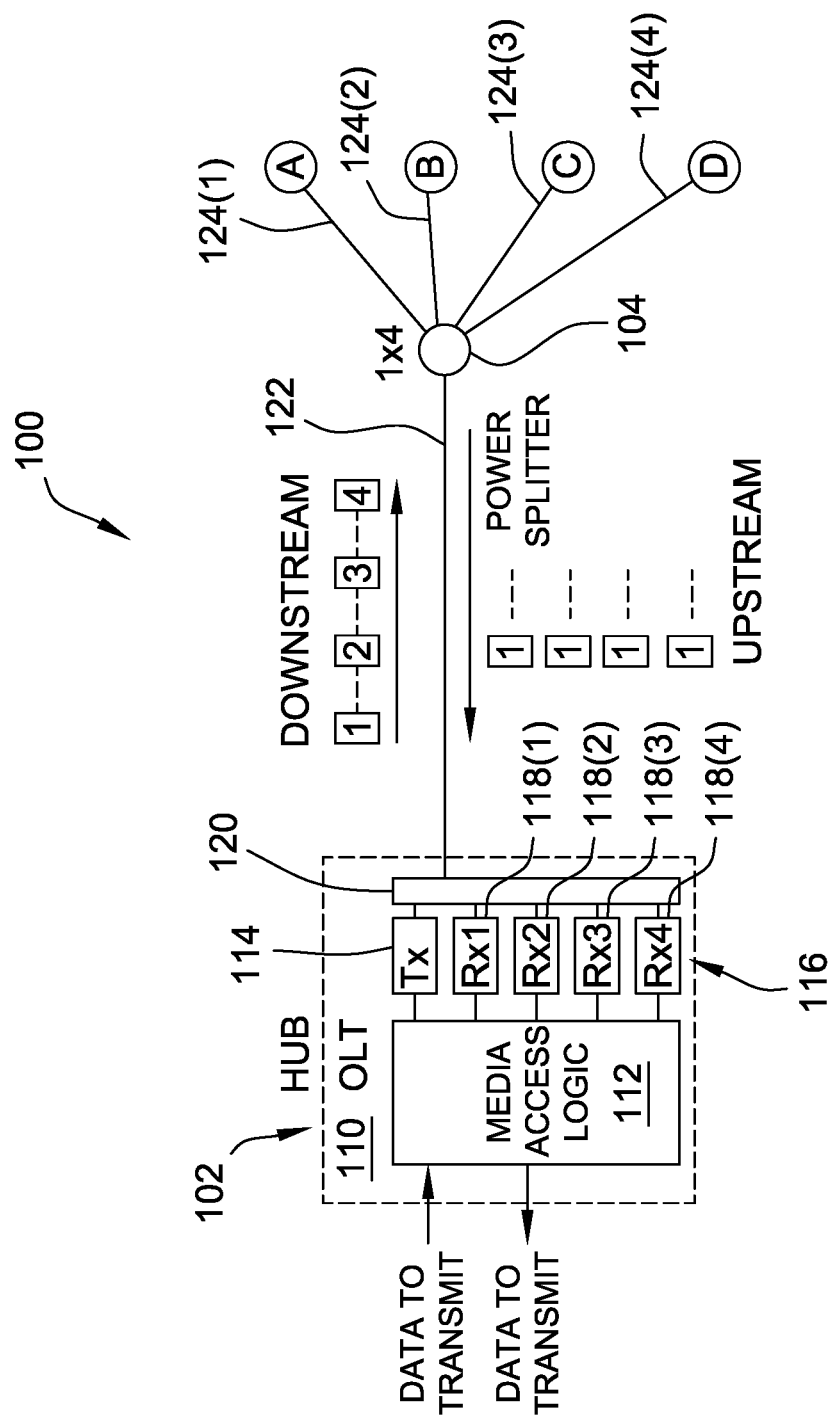
FIGS. 1A-C are schematic illustrations of an exemplary fiber communication system, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The coherent PON systems and methods herein are capable of deploying optical transmissions, including NG-PON and 100G-EPON, for long distance fiber trunk links, and are particularly advantageous in the deployment of coherent technologies in FTTP access networks. Coherent technologies have been recently implemented for optical metro and access networks, in both brown- and green-field deployments. Digital coherent systems utilize digital signal processing (DSP) techniques, and achieve high spectral efficiency (SE), higher data rate per channel, and superior receiver sensitivity that allows for extended power budget. Coherent detection is capable of high frequency selectivity through local oscillator (LO) tuning capability, which enables closely spaced, dense/ultra-dense WDM (DWDM) without requiring additional narrow band optical filters. Coherent detection systems recover a multi-dimensional signal, which, among other things, compensates for linear transmission impairments such as chromatic dispersion (CD) and polarization-mode dispersion (PMD). Coherent detection more efficiently utilize the spectral resources, and may take advantage of future network upgrades through the use of multi-level advanced modulation formats. This utilization of coherent optics has now migrated from long haul and metro networks, to data-center interconnect (DCI) and near-future access networks.

According to the embodiments herein, a coherent PON architecture is implemented with an FTTP network to enable an increased downstream transmission over greater distances, and with increased split ratios. The illustrative examples are described below with respect to a 100G coherent PON architecture spanning a fiber distance of approximately 80 km, and having a split ratio of 1:256. According to these advantageous architectures, passive technologies expand the capability and reach of existing fiber networks, and without the need of mid-span and pre-amplifiers. Moreover, the systems and methods herein more effectively increase the size of the serving group, with significantly greater achievable single channel capacity, and thereby achieve a greater potential to meet future bandwidth demand and reduce operational costs through network consolidation.

The present embodiments, through implementation of passive technology, are still further able to reach the upstream power budget without requiring pre-amplification, by utilizing time-wavelength division multiplexing access (TWDMA). In the exemplary embodiment described below (i.e., 100G coherent PON), TWDMA utilizes channel spacing larger than 50 GHz to mitigate the impact of back-reflections, which include Fresnel reflection (discrete reflections from Jumper cable/optical distribution panels/fusion or mechanical splices), Rayleigh Scattering (Continuous reflection), and Multiple-Path Interference. In at least one exemplary embodiment, a burst signal structure in an access coherent burst mode receiver realizes significantly faster adaption and convergence, in comparison with conventional structures. For example, utilizing coherent detection technologies, the receiver sensitivity is significantly greater as compared with conventional direct detection technologies.

As described herein, the innovative combination of coherent technology with a PON enables superior receiver sensitivity, and thus advantageously achieves an extended power budget and reduces the lower bound on the required received power for error-free transmission. This additional power budget may then be used to increase the maximum reach of the optical link, and/or to increase the split ratio to accommodate more individual end users in a PON. According to the techniques described herein, the optical reach, the split ratio, and the data capacity in a FTTP application scenario are more optimally balanced.

Figure 1B:
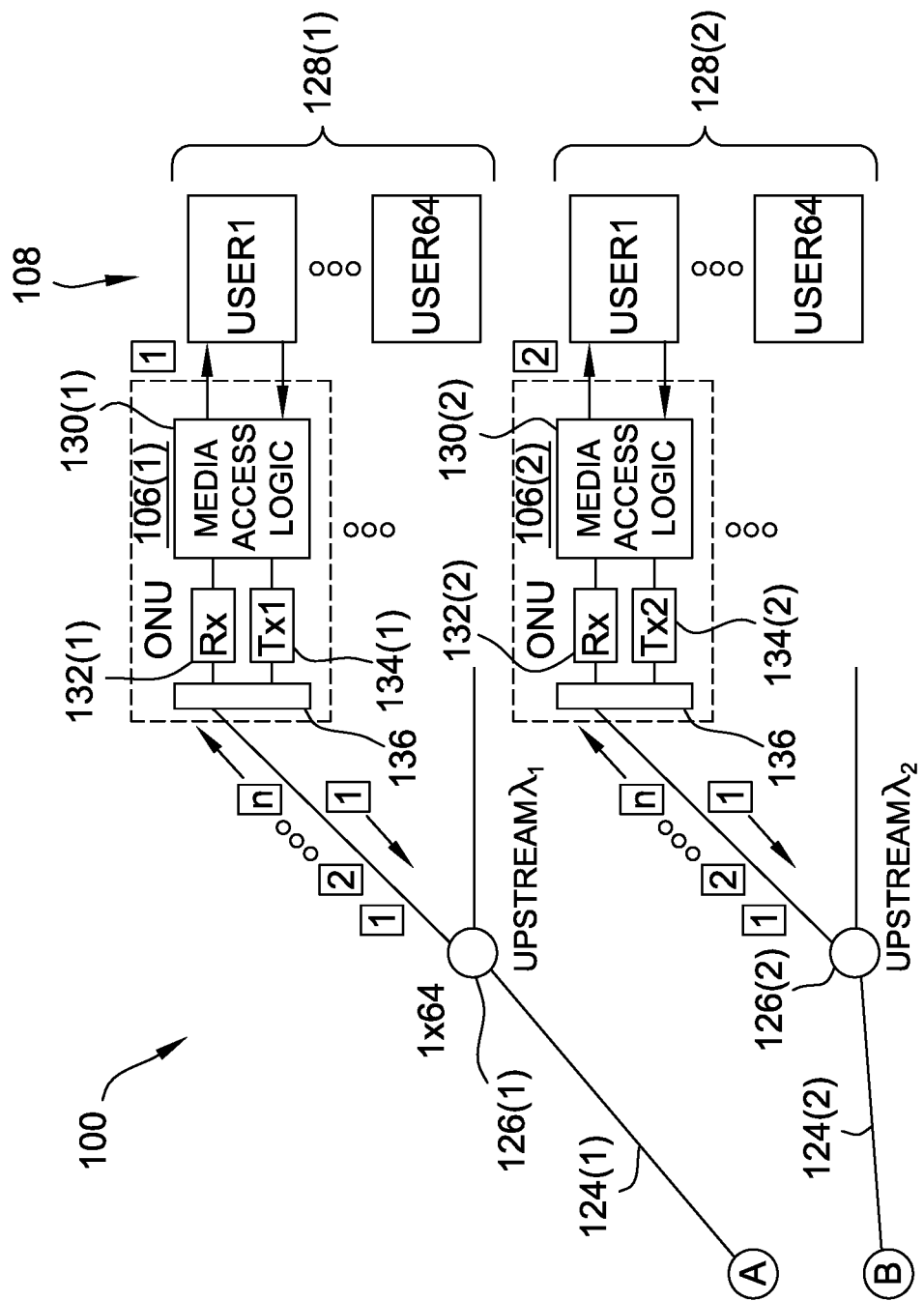
Figure 1C:
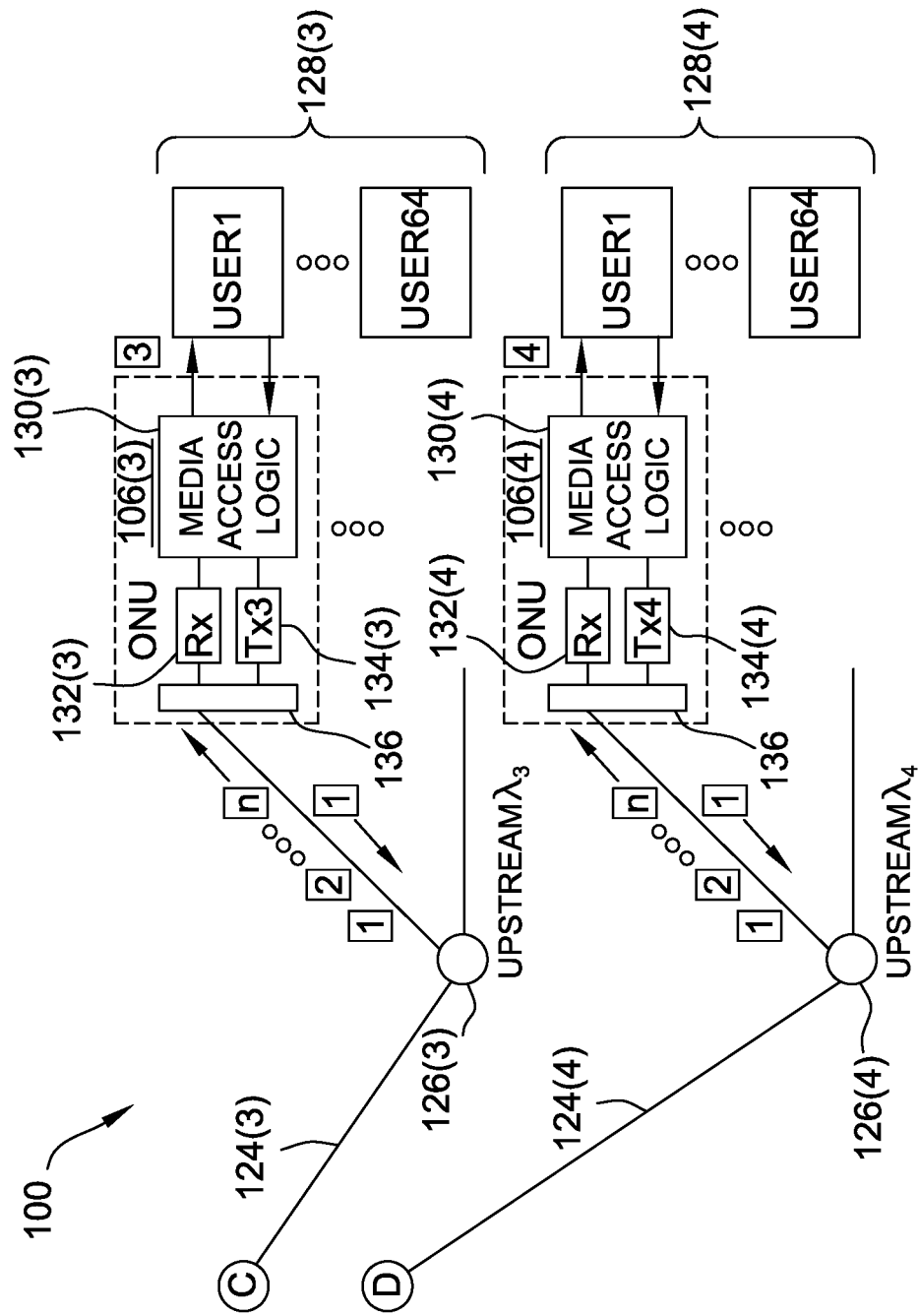

FIGS. 1A-C are schematic illustrations of an exemplary fiber communication system 100. System 100 includes an optical hub 102, a power splitter 104, and a plurality of optical network units (ONUs) 106 in communication with a plurality of customer premises 108, or users, respectively. Optical hub 102 is, for example, a central office, a communications hub, and includes an optical line terminal (OLT) 110 for converting standard signals from a service provider (not shown) to the frequency and framing used by the PON system, and for coordinating multiplexing between conversion devices on ONUs 106 respectively located on or near customers premises 108. Power splitter 104 may be, for example, a power splitter/combiner.

In the exemplary embodiment, OLT 110 contains a hub processor 112 including media access logic, and configured to receive and transmit data to the service provider. Processor 112 is in operable communication with at least one downstream transmitter 114 and at least one upstream receiver 116. In this embodiment, upstream receiver 116 includes a plurality of upstream subreceivers 118, which may be separate components, or separate circuits or portions of a single upstream receiver 116. In the example illustrated in FIG. 1A, OLT 110 includes one downstream transmitter 114 which may be a 100G coherent transmitter, for four separate upstream subreceivers 118, which may be 25G coherent receivers. Downstream transmitter 114 and upstream receiver 116 are in operable communication with a first multiplexer/demultiplexer 120. In some embodiments, OLT 110 may further include other components (not shown) including, without limitation, a central processing unit (CPU), passive optical network cards, a gateway router (GWR), and voice gateway (VGW) uplink cards.

In at least one embodiment, downstream transmitter 114 and upstream receiver 116 may be included in a single transceiver (not separately shown). Exemplary architectures of hub and ONU components are described in greater detail in co-pending U.S. patent application Ser. No. 15/283,632, filed Oct. 3, 2016, co-pending U.S. patent application Ser. No. 15/590,464, filed May 9, 2017, and co-pending U.S. patent application Ser. No. 15/609,461, filed May 31, 2017, the disclosures of all of which are incorporated by reference herein.

In the exemplary embodiment, ONUs 106 are downstream termination units for the respective customer premises 108. In this configuration, a long fiber 122 carries optical signals over a distance from optical hub 102 to power splitter 104. In the exemplary embodiment, long fiber 122 spans a distance of up to 80 kilometers, for a fixed set of wavelengths 1-n. In the exemplary embodiment illustrated in FIG. 1A, n=1, and power splitter 104 is a 1×4 power splitter, which splits the 100G optical signals from long fiber 122 into the different 25G signals of fixed wavelengths, which are then carried from power splitter 104 by individual short fibers 124 to a plurality of optical splitters 126. Each optical splitter further splits the optical signals from an individual short fiber 124 into the different fixed wavelengths, which are then carried between optical splitter 126 and a serving group 128 of respective ONUs 106. In the exemplary embodiment, system 100 includes one optical splitter for each serving group 128, respectively. System 100 may be configured, for example, for 1-to-32 or 1-to-64 split ratios (a 1-to-64 split ratio is illustrated in FIG. 1) using a fixed set of wavelengths. Optical splitters 126 may be, for example, optical splitters/combiners.

In an exemplary embodiment, upstream and downstream transmissions are carried over a single long fiber 122. In some embodiments, long fiber 122 may dedicate separate strands for the upstream and downstream transmissions, respectively. In at least one embodiment, system 100 may implement a PON extender such as that illustrated in co-pending U.S. patent application Ser. No. 15/609,461.

In the exemplary embodiment, each ONU 116 contains an ONU processor 130 including media access logic, and which configured to receive and transmit data to individual customer premises/users 108. Processor 130 is in operable communication with at least one downstream receiver 132 and at least one upstream transmitter 134. In the example illustrated in FIGS. 1B-C, downstream receivers 132 may be 100G coherent receivers, and upstream transmitters 134 may be 25G coherent transmitters. This asymmetrical coherent reception for downstream and upstream enables enough margin for PON systems. For example, compared to 100G downstream coherent reception, 25G upstream PON has 6-dB higher receiver sensitivity, which translates to 6-dB more link margin for the same transmission distance. Downstream receiver 132 and upstream transmitter 134 are in operable communication with a second multiplexer/demultiplexer 136.

According to the exemplary embodiment, the architecture of system 100 implements 100G coherent PON to enable downstream transmission at fiber distance ranges up to 80 km, while increasing the split ratio to 1:256 without the need of mid-span and pre-amplifiers. By extending the reach passively, and by increasing the size of the serving group, a significantly higher single channel capacity is achieved. This advantageous architecture is better able to meet future bandwidth demand and reduce operational cost through network consolidation.

According to the techniques of system 100, the upstream power budget is reached without the need for a preamplifier. In an exemplary embodiment, TWDMA is implemented with the channel spacing larger than 50 GHz to mitigate the impact of backreflections. In at least one embodiment, a burst signal structure realizes faster adaption and convergence in an access coherent burst mode receiver, as described below with respect to FIG. 4.

In operation of system 100, exemplary performance is achieved in both the downstream and upstream directions. In the downstream direction, signals are broadcast to all serving groups 128, with each serving group covering 64 users 108, thereby resulting in 256 total end points. In this example, the signal capacity is 100 Gb/s, and the distance reach of system 100 is up to 80 km. According to these advantageous techniques, a cascade tree and/or a start architecture are both enabled.

Figure 4:
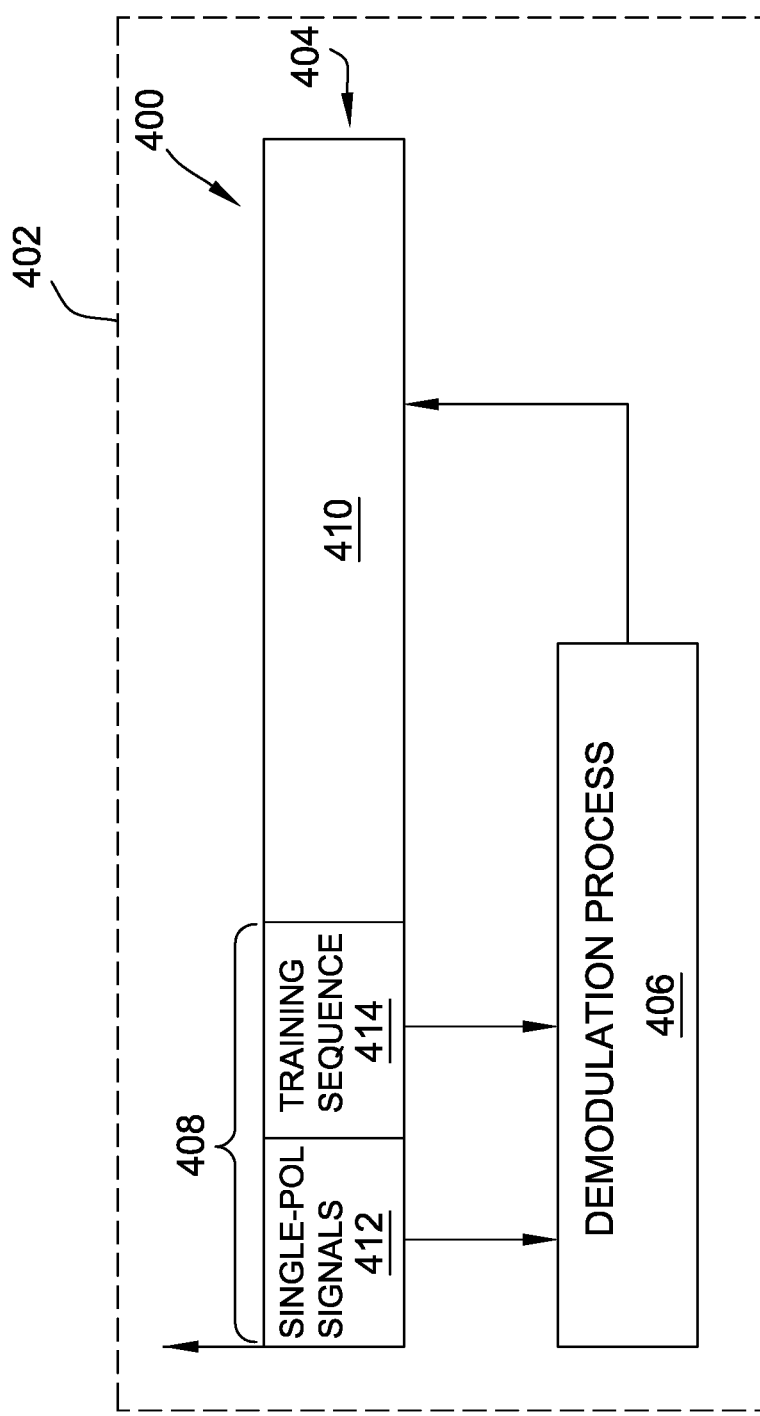
FIG. 4 is a schematic illustration of an exemplary burst signal format for a coherent burst mode receiver, in accordance with an embodiment.

In the upstream direction, exemplary operation is based on a TWDM access mechanism in a coherent burst mode receiver (FIG. 4, below). Each different serving group 128 is based on WDM technology, which is used to multiplex a plurality (1-n, where n=4 in the example illustrated) of PON streams λ onto a single fiber (e.g., long fiber 122), and spacing greater than 50 GHz is used to avoid backreflections for bidirectional operation on the same fiber. In this example, TDMA is implemented for each serving group 128, and at 25 Gb/s at each upstream wavelength. In some embodiments, second multiplexer/demultiplexer 136 includes an optical filter to combine/separate different wavelengths to the various transmitters and receivers. In at least one embodiment, multiplexer/demultiplexer may be a diplexer. This advantageous architecture still further enables significantly improved versatility for fixed or tunable local oscillators (LOs), as compared with conventional techniques. As illustrated in FIGS. 1A-C, each ONU 106 receives all of the 1-n PON streams in the downstream direction, and each ONU 106 transmits a single PON stream in the upstream direction.

Figure 2A:
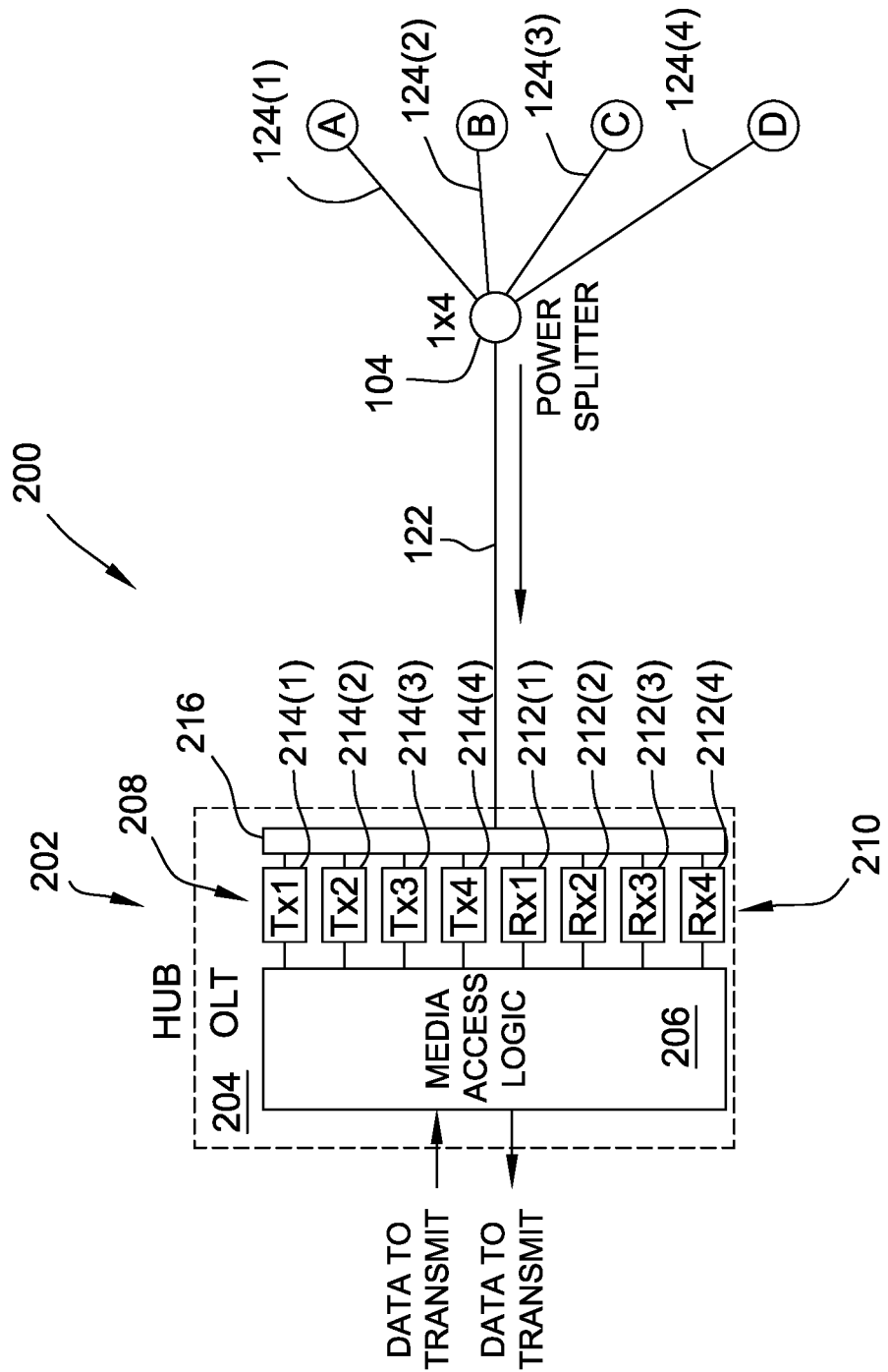
FIGS. 2A-C are schematic illustrations of a fiber communication system implementing upstream and downstream TWDM, in accordance with an alternative embodiment.
Figure 2B:
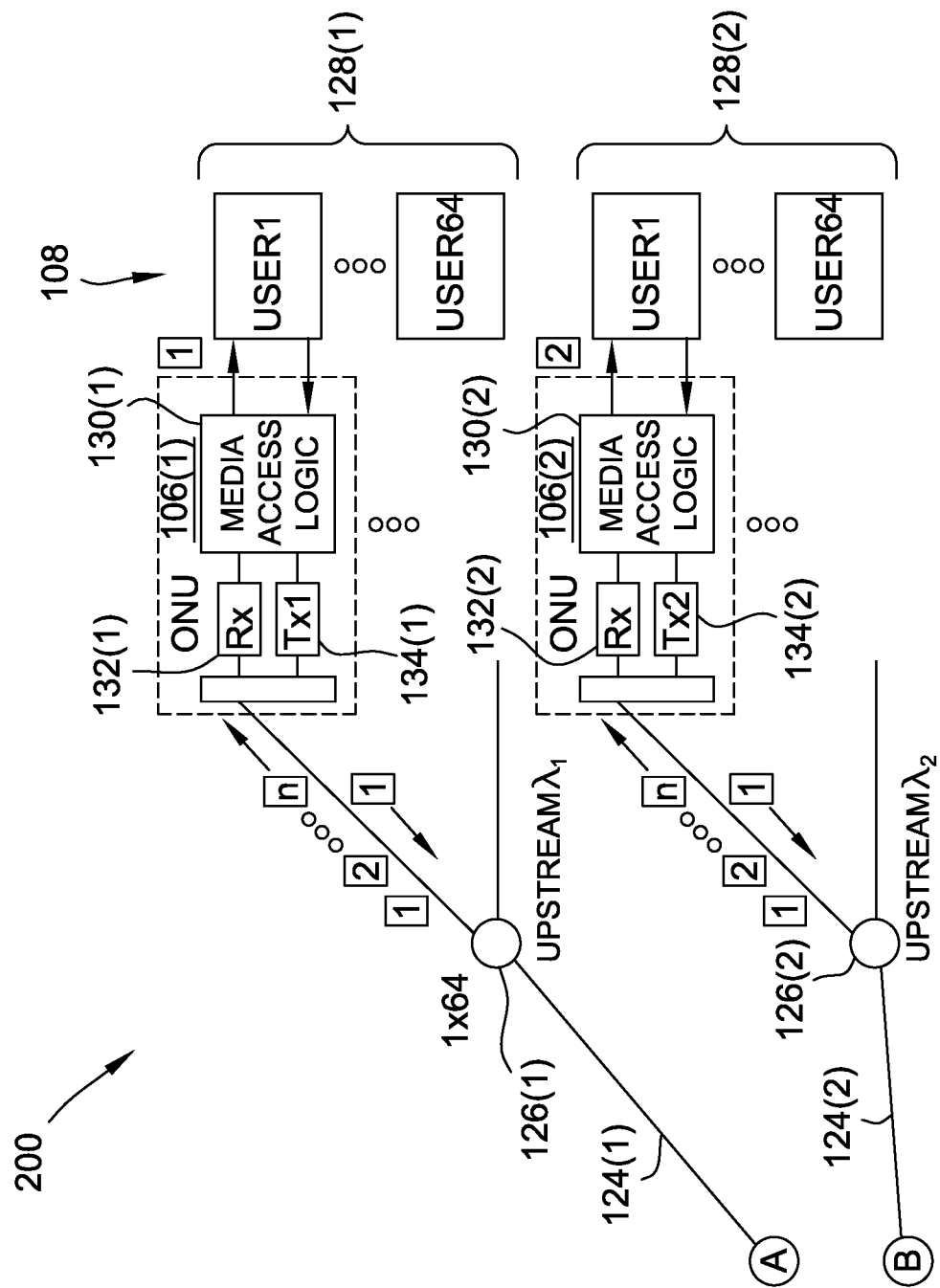
Figure 2C:
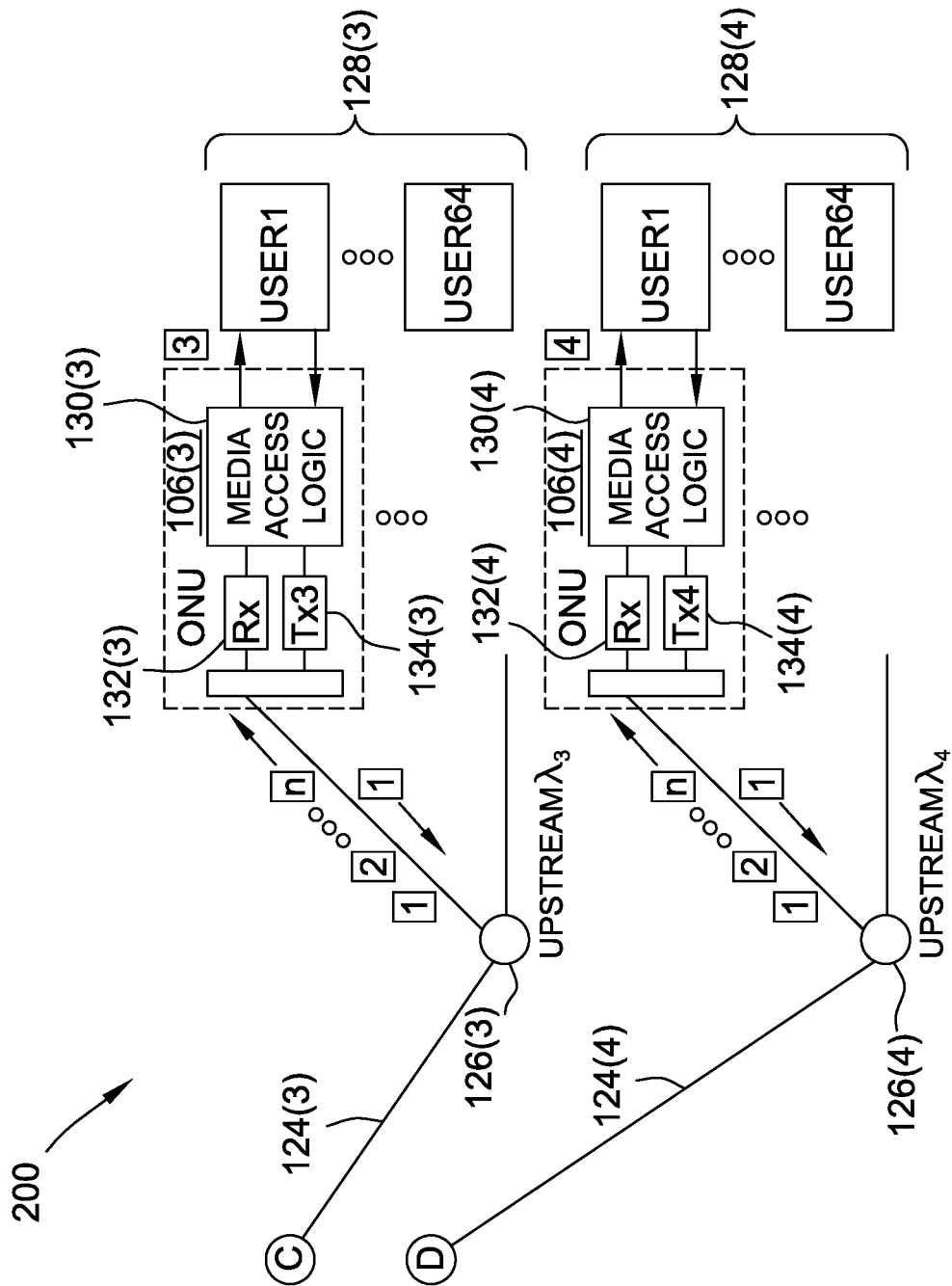

FIGS. 2A-C are schematic illustrations of a fiber communication system 200. System 200 is similar to system 100, except that in the exemplary architecture of system 200, TWDM coherent PON technology is implemented in both the upstream and the downstream directions. Elements that are common to both systems 100 and 200 are labeled with the same reference numerals for ease of explanation.

More particularly, to implement TWDM coherent PON technology in the downstream direction, the downstream architecture of system 200 (i.e., FIGS. 2B-C) may remain substantially the same as the downstream architecture of system 100 (i.e., FIGS. 1B-C, above). The upstream architecture of system 200 (i.e., FIG. 2A) though, is modified from system 100. That is, in the exemplary embodiment, system 200 includes an optical hub 202 in operable communication with power splitter 104 along long fiber 122. Similar to optical hub 102, FIG. 1A, optical hub 202 includes an OLT 204 for converting standard signals from the service provider (not shown) to the frequency and framing used by the PON system, and for coordinating multiplexing between conversion devices on ONUs 106.

In an exemplary embodiment, OLT 204 contains a hub processor 206 including media access logic, and configured to receive and transmit data to the service provider. Processor 206 is in operable communication with at least one downstream transmitting portion 208 and at least one upstream receiving portion 210. Similar to upstream receiver 116, FIG. 1, upstream receiving portion 210 includes a plurality of upstream subreceivers 212, which may be separate components, or separate circuits or portions of a single upstream receiver. In the example illustrated in FIG. 2A, downstream transmitting portion 208 includes a plurality of subtransmitters 214, which also may be separate components, or separate circuits or portions of a single upstream transmitter. In the exemplary embodiment, each of subtransmitters 214 is a 25G coherent transmitter, and each of upstream subreceivers 212 is a 25G coherent receiver. In some embodiments, one or more of subtransmitters 214 may be paired with a respective subreceiver 212 as an individual subtransceiver. Downstream transmitting portion 208 and upstream receiving portion 210 are in operable communication with a first multiplexer/demultiplexer 216, which may also be a diplexer.

In operation of system 200, ONUs 106 receive 1-n downstream optical carrier signals from short fibers 124 using standard PON optics. Optical splitters 126 also function as nodes of the architecture of system 200. In this example, ONUs 106 are again illustrated to represent 64 users 108 per serving group 128. ONUs 106 may have a symmetric architecture (e.g., 10/10G-EPON), or an asymmetric architecture (e.g., 10/1G-EPON). Downstream subtransmitters 214 are each configured to transmit a downstream optical signal $\lambda_{D(1-n)}$ to multiplexer/demultiplexer 216, and upstream subreceivers 212 are each configured to receive an upstream optical signal $\lambda_{U(1-n)}$ from multiplexer/demultiplexer 216. That is, the multiplexing function of multiplexer/demultiplexer 216 combines the plurality of downstream optical signals $\lambda_D$ for downstream transmission over long fiber 122, and the demultiplexing function splits the upstream transmission from long fiber 210 into the plurality of respective upstream optical signals Xu.

In further operation of system 200 the power budget may be calculated as follows:

In the downstream direction, a value of fiber loss (including the average connector loss) is assumed to be 0.25 dB/km. Over an 80 km span, the total fiber loss would be approximately 20 dB. The downstream split loss (also in dB) then corresponds to the 1:256 split ratio, for a total expected loss of approximately 25 dB. Given an optical transmitted power with a booster amplifier (not shown) of approximately 10 dBm, and a 100G receiver sensitivity of approximately −40 dBm (at 2×10−2 with preamplifier), the total power budget (in dB) can be calculated according to 10−(−40)−20−25, or 5 dB.

Thus, it can be seen that the cost associated with including an optical booster amplifier in each ONU 106 would be prohibitive. According to the systems and methods described herein though, the loss budget is improved by group segmentation and wavelength multiplexing for lower data capacity per upstream wavelength. This improvement to the loss budget can be seen by calculating the power budget in the upstream direction as follows.

Specifically, in the upstream direction, the fiber loss in the split loss will be the same as in the downstream direction, i.e., 20 dB and 25 dB, respectively. However, the optical transmitted power without a booster amplifier is approximately ~0 dBm, in these activities of a 25G receiver sensitivity is approximately −49 dBm (at 2×10−2 with preamplifier). Accordingly, the total power budget (in dB) can be calculated according to 0−(−49)−20−25, or 4 dB. Thus, the additional power budget realized herein is useful to increase the maximum reach of the optical link, and or to increase the split ratio to accommodate more individual end users in the PON.

According to the advantageous configuration of system 200, the exemplary PON architecture realizes further versatility with respect to the ability to service particular, or increasing quantities of, end users 108. In this example, both the downstream the upstream transmission are based on four wavelengths, thereby enabling more targeted transmissions downstream optical signals into individual serving groups 128, but while still maintaining fiber transmission distances of up to 80 km utilizing passive technologies (e.g., without the need for pre-amplification or mid-span). As illustrated below with respect to FIGS. 3A-C, this bi-directional TWDM technique allows for still further modifications and innovations to enable targeted transmissions to single ONUs 106, which is particularly advantageous in the case where a single ONU represents a high-volume business user, for example.

Figure 3A:
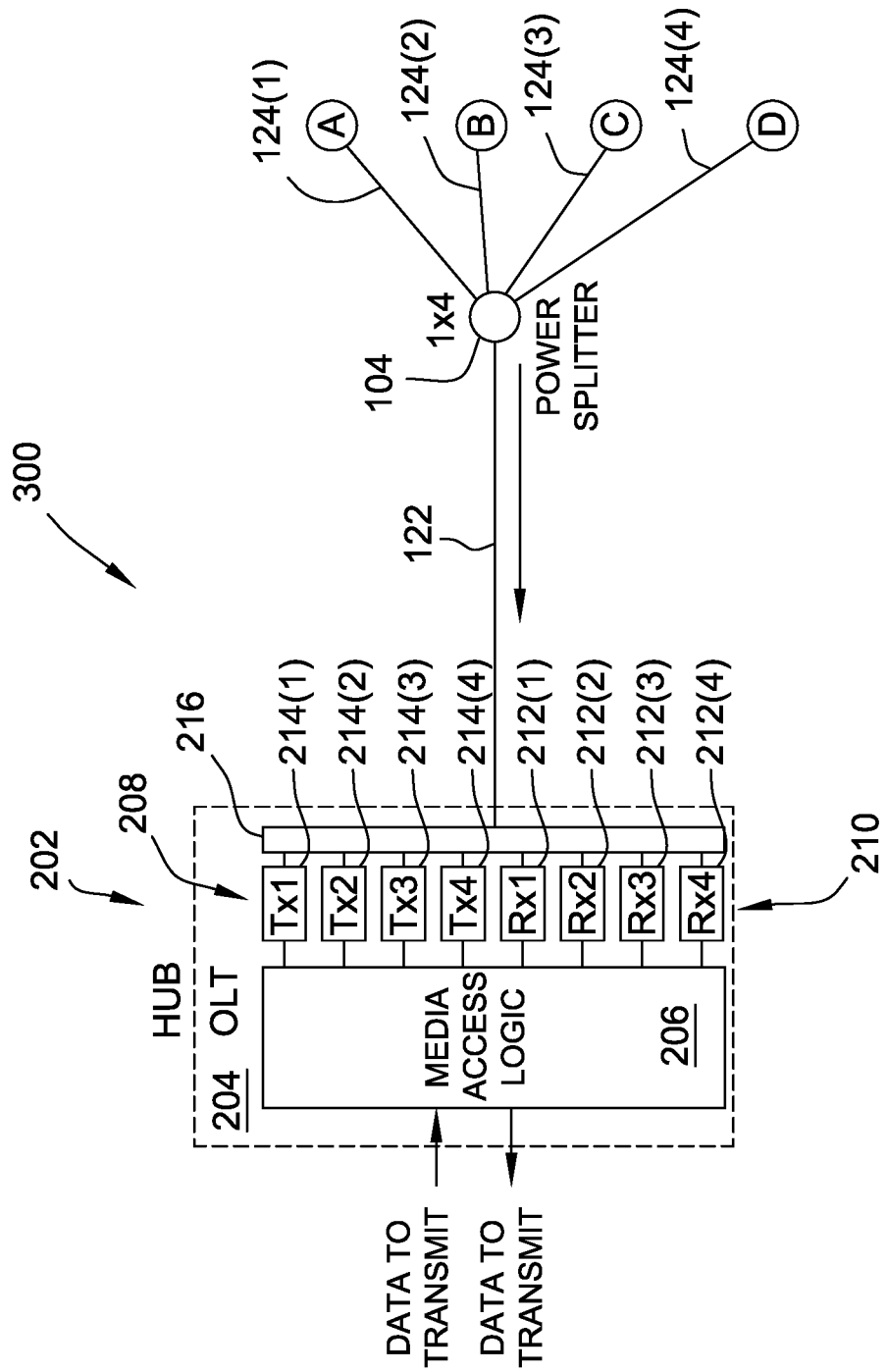
FIGS. 3A-C are schematic illustrations of the fiber communication system depicted in FIGS. 2A-C, configured for specific wavelength to single end users.
Figure 3B:
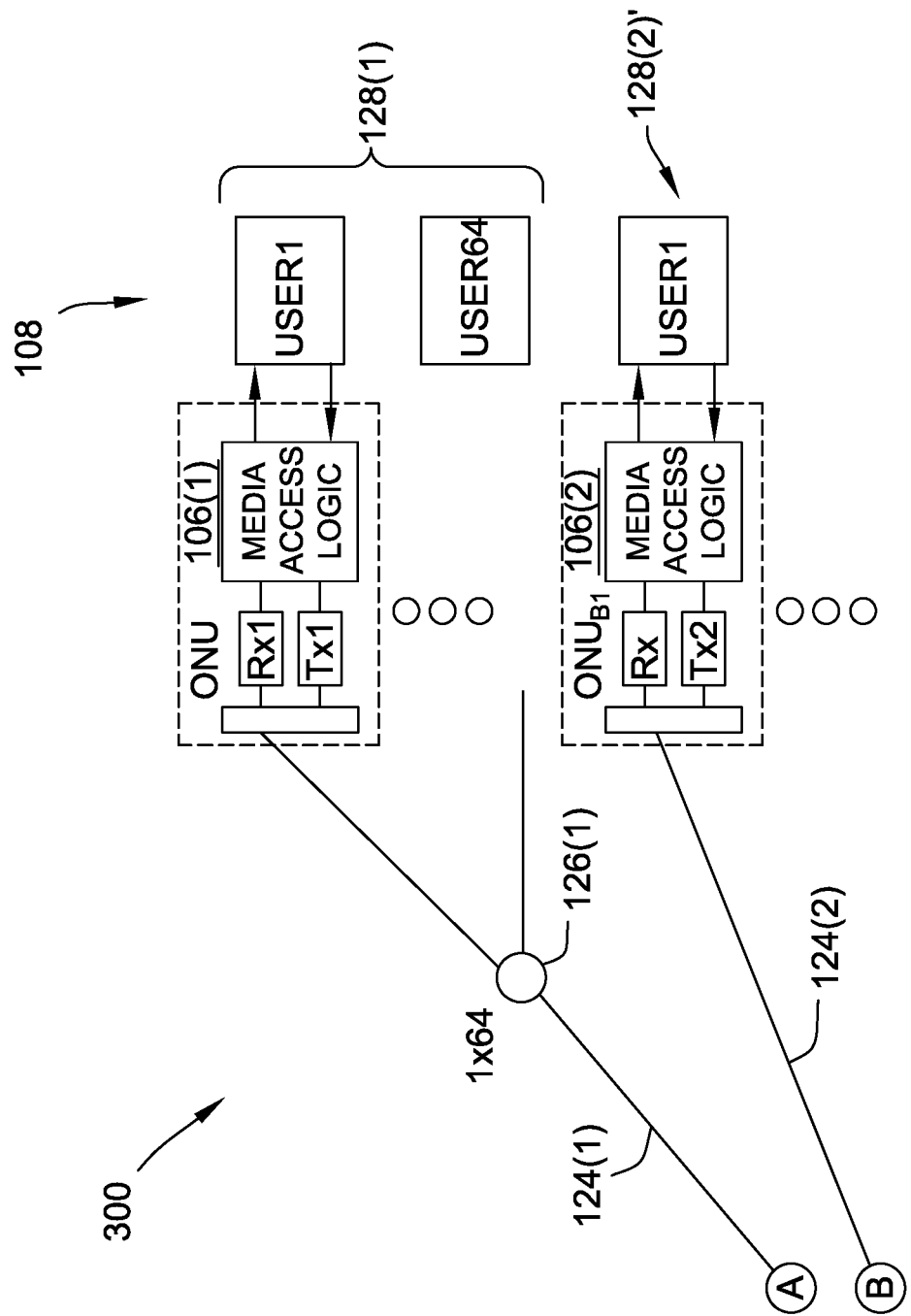
Figure 3C:
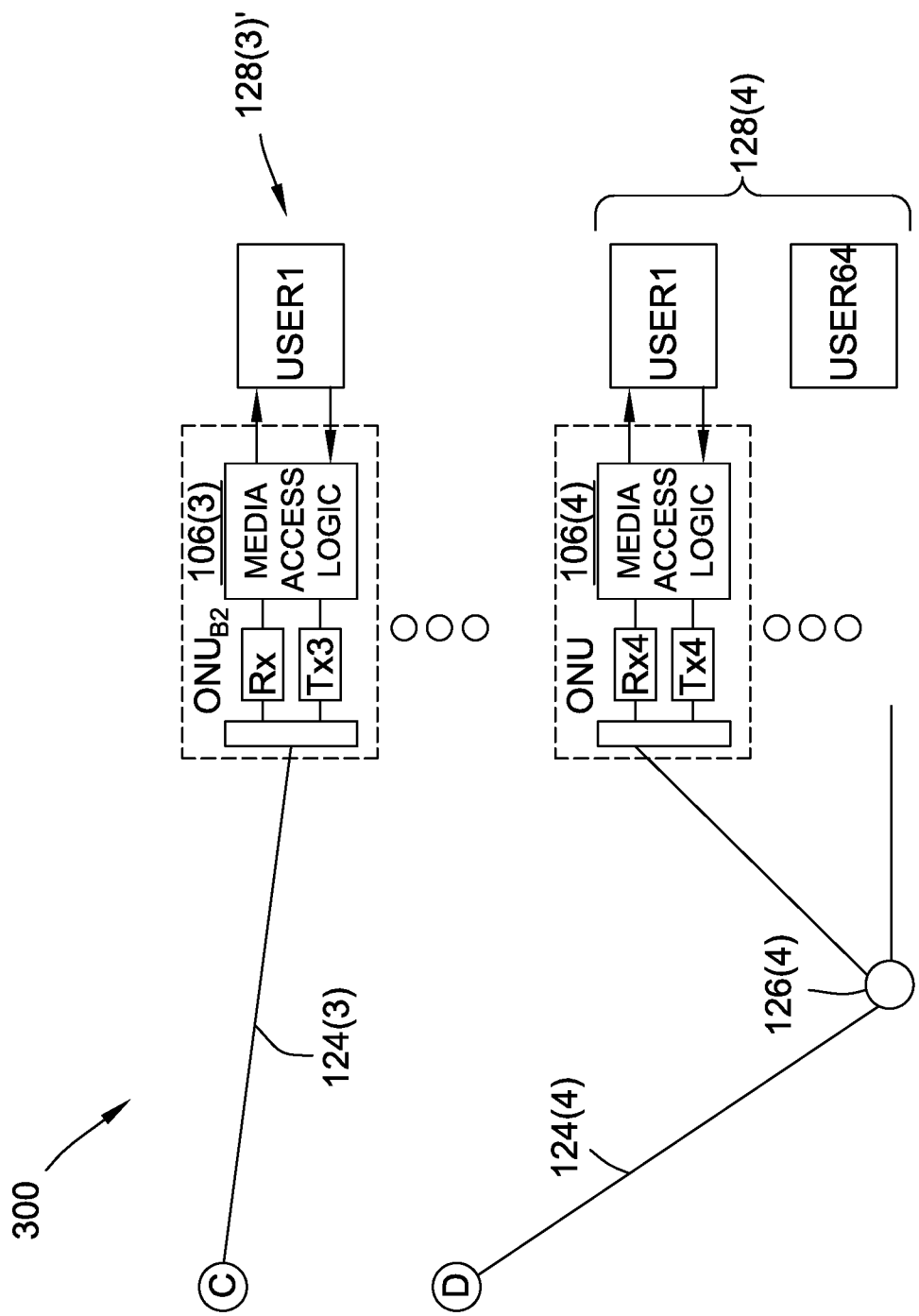

FIGS. 3A-C are schematic illustrations of a fiber communication system 300. System 300 is similar to system 200, FIGS. 2A-C, except that system 300 is configured to transmit one or more specific wavelengths to single end users 108. Accordingly, elements that are common to both systems 200 and 300 (as well as system 100, FIGS. 1A-C) are labeled with the same reference numerals for ease of explanation.

More particularly, according to the exemplary embodiment illustrated in FIGS. 3B-C, individual serving groups 128 of system 300 may serve a variable quantity of ONUs 106. That is, where serving groups 128(1) and 128(4) are substantially the same in systems 100, 200, and 300, serving groups 128(2)' and 128(3)' are different from serving groups 128(2) and 128(3), FIGS. 1B-C, 2B-C, in that serving groups 128(2)' and 128(3)' each represent a single ONU 106 and a single user 108 (i.e., users 108(2)' and 108(3)', respectively). In the exemplary embodiment, it can be further seen that, where a particular serving group 128 represents a single ONU 106 and user 108, the need for an additional optical splitter/node 126 is eliminated. That is, in some embodiments, short fibers 124 (e.g., short fibers 124(2) and 124(3)) may directly connect power splitter 104 to individual ONUs 106 (e.g., ONUs 106(2) and 106(3), respectively).

According to this alternative embodiment, the passive technology techniques described above can be maintained over similar lengths of fiber deployment (e.g., 80 km), but for fewer individual end users 108 (130 in this example, as compared with 256 in the examples described above).

FIG. 4 is a schematic illustration of an exemplary burst signal format 400 for a coherent burst mode receiver 402. Burst mode receiver 402 may be implemented, for example, with any or all of systems 100, 200, 300, described above. Burst signal format 400 is configured to process a data stream 404 against a demodulation process 406. Data stream 404 includes at least one header 408 and at least one payload 410. In the exemplary embodiment, header 408 is configured to include a first portion 412 having single polarization (single-pol) signals, and a second portion having a training sequence 414.

In exemplary operation of burst mode receiver 402, the single-pol signals of first portion 412 and the training sequence of second portion 414 are subjected to demodulation process 406 to increase the reliability of payload 410. Specifically, demodulation process 406 (i) enables independent detection of static information without the need for polarization demultiplexing (thereby advantageously lowering the data rate), and (ii) provides a dynamic channel information. Through the advantageous configuration of burst signal format 400, the static and dynamic information may both be more effectively utilized in demodulation process 406 for payload 410 to realize a significantly faster convergence speed.

Due to the topology of PONs, the respective transmission modes for downstream and upstream are different from one another. Burst-mode coherent detection should therefore be realized when multiple optical network units (ONUs) send signals back to the same optical line terminal (OLT). For a particular ONU, the ONU only transmits an upstream optical packet when the ONU is allocated a time slot for the transmission (and the ONU needs to transmit). All of the multiple ONUs share the upstream channel in the time division multiple access (TDMA) mode, but all of the respective upstream signals therefrom will have different power levels, different wavelength drifting, and different lengths of signal durations. Conventional techniques have had significant difficulty in completing receiver equalization within the time of a 100-Gb/s burst overhead. The techniques described and illustrated with respect to FIG. 4 though, are able to advantageously utilize one or more of the preamble, synchronization bits, training symbols, and pilot signals from the data stream to achieve faster channel estimation, and to provide the required converged value(s) of one or more digital filter taps for the equalization of the payload data of the signal within a much shorter time.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A transceiver for an optical communication network, comprising:
a processor configured to format an input data signal into an outgoing modulated data stream having a sequential series of data bursts, each data burst in the sequential series including (i) a data header portion, and (ii) a payload data portion; and
a transmitting portion configured to transmit the outgoing modulated data stream to the optical communication network for reception by a plurality of remote receiving units in communication with the optical communication network,
wherein the processor is further configured to format each data burst such that the data header portion includes a single-polarization signal data sequence enabling a remote receiving unit of the plurality of remote receiving units to equalize the data payload portion using the single-polarization signal data sequence from the corresponding data header portion.

2. A transceiver for an optical communication network, comprising:
a processor configured to format an input data signal into an outgoing modulated data stream having a sequential series of data bursts, each data burst in the sequential series including (i) a data header portion, and (ii) a payload data portion; and
a transmitting portion configured to transmit the outgoing modulated data stream to the optical communication network for reception by a plurality of remote receiving units in communication with the optical communication network,
wherein the processor is further configured to format each data burst such that the data header portion includes information enabling a remote receiving unit of the plurality of remote receiving units to equalize the data payload portion using the information from the corresponding data header portion, and
wherein the data payload portion includes a data sequence modulated based on the information in the data header portion.

3. The transceiver of claim 1, configured as an optical line terminal (OLT).

4. The transceiver of claim 3, disposed within a hub of the optical communication network.

5. The transceiver of claim 1, wherein the local transmitting portion is further configured to transmit a modulated time division multiple access (TDMA) data signal to the optical communication network.

6. The transceiver of claim 1, further comprising a receiving portion in operable communication with the processor and configured to receive at least one upstream burst mode signal from a respective remote receiving unit of the plurality of remote receiving units.

7. The transceiver of claim 6, wherein the local receiving portion is configured for 100G coherent reception.

8. The transceiver of claim 6, wherein the local transmitting portion includes a number of local transmitting units corresponding to a number of remote receiving units included in the plurality of remote receiving units.

9. The transceiver of claim 8, wherein the local transmitting portion includes a time and wavelength division multiplexing (TWDM) access mechanism configured to transmit the outgoing modulated data stream in a TWDM format.

10. The transceiver of claim 9, wherein the local transmitting portion is configured for 25G upstream coherent transmission.

11. The transceiver of claim 6, wherein the local receiving portion and the local transmitting portion are configured for symmetrical operation.

12. The transceiver of claim 6, wherein the local receiving portion and the local transmitting portion are configured for asymmetrical operation.

13. The transceiver of claim 6, wherein the local transmitting portion and the local receiving portion are configured to communicate with the optical communication network through a multiplexer/demultiplexer.

14. The transceiver of claim 6, configured as a downstream termination unit.

15. The transceiver of claim 14, wherein the optical communication network includes a passive optical network (PON), wherein the local receiving portion is configured to receive a plurality of downstream PON streams from the plurality of remote receiving units, and wherein the local transmitting portion is configured to transmit a single upstream PON stream to the optical communication network.

16. The transceiver of claim 14, wherein the processor is further configured to format each data burst to enable the remote receiving to perform signal equalization within a 100 Gb/s burst overhead.

17. The transceiver of claim 1, wherein the local transmitting portion is further configured to transmit the outgoing modulated data stream over a network communication channel of the optical communication network using a channel spacing of 50 GHz or greater.

18. The transceiver of claim 1, wherein the local transmitting portion is configured for 100G upstream coherent transmission.

19. The transceiver of claim 1, wherein the processor comprises at least one of a central processing unit (CPU), a passive optical network (PON) card, a gateway router (GWR), and a voice gateway (VGW) uplink card.

* * * * *